US011227284B2

(12) United States Patent
Safak

(10) Patent No.: US 11,227,284 B2
(45) Date of Patent: Jan. 18, 2022

(54) METHOD AND SYSTEM FOR CONSUMER-INITIATED TRANSACTIONS USING ENCRYPTED TOKENS

(71) Applicant: Mastercard International Incorporated, Purchase, NY (US)

(72) Inventor: Ilgin Safak, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 422 days.

(21) Appl. No.: 15/840,069

(22) Filed: Dec. 13, 2017

(65) Prior Publication Data

US 2019/0180275 A1    Jun. 13, 2019

(51) Int. Cl.
*G06Q 20/38* (2012.01)
*G06Q 20/20* (2012.01)
*H04L 9/06* (2006.01)

(52) U.S. Cl.
CPC ....... *G06Q 20/3825* (2013.01); *G06Q 20/382* (2013.01); *G06Q 20/385* (2013.01);
(Continued)

(58) Field of Classification Search
None
See application file for complete search history.

(56) References Cited

U.S. PATENT DOCUMENTS

| | | | |
|---|---|---|---|
| 2012/0136796 A1* | 5/2012 | Hammad | G06Q 20/3674 705/67 |
| 2015/0324736 A1* | 11/2015 | Sheets | G06Q 10/083 705/330 |

(Continued)

FOREIGN PATENT DOCUMENTS

| | | |
|---|---|---|
| CN | 107358424 A | 11/2017 |
| CN | 107392603 A | 11/2017 |
| WO | 2016/033610 A1 | 3/2016 |

OTHER PUBLICATIONS

Notification of Transmittal of the International Search Report and the Written Opinion of the International Searching Authority (PCT/ISA/220, PCT/ISA/210 and PCT/ISA/237) dated Mar. 1, 2019, by the European Patent Office in corresponding International Application No. PCT/US2018/061170. (12 pages).

*Primary Examiner* — Jamie R Kucab
*Assistant Examiner* — Nicholas K Phan
(74) *Attorney, Agent, or Firm* — Buchanan Ingersoll & Rooney PC

(57) ABSTRACT

A method for consumer-initiated transactions with encrypted tokens includes: storing a first cryptographic key pair comprising an account public key and an account private key, a merchant public key, an account token associated with a transaction account, an account identifier, and an issuing institution identifier; receiving transaction data for a proposed payment transaction including a transaction amount; generating a transaction order including the transaction data; generating a cryptographic checksum for the generated transaction order; generating a digital signature over the cryptographic checksum using the account private key; generating a payment token including the issuing institution identifier, the account identifier, the transaction amount, and the account token; encrypting the payment token using the account private key; and transmitting the encrypted payment token and signed cryptographic checksum to a point of sale device.

20 Claims, 8 Drawing Sheets

(52) U.S. Cl.
CPC ..... *G06Q 20/3823* (2013.01); *G06Q 20/3827* (2013.01); *G06Q 20/3829* (2013.01); *H04L 9/0637* (2013.01); *G06Q 20/20* (2013.01); *H04L 2209/38* (2013.01); *H04L 2209/56* (2013.01)

(56) References Cited

U.S. PATENT DOCUMENTS

| | | | |
|---|---|---|---|
| 2016/0253663 A1* | 9/2016 | Clark | G06Q 20/3274 705/75 |
| 2016/0381010 A1* | 12/2016 | Bhandari | H04L 63/0435 713/171 |
| 2017/0324560 A1* | 11/2017 | Pesonen | H04L 9/3228 |
| 2019/0164157 A1* | 5/2019 | Balaraman | H04L 9/3239 |
| 2019/0173667 A1* | 6/2019 | Wang | G06F 21/64 |

* cited by examiner

METHOD AND SYSTEM FOR CONSUMER-INITIATED TRANSACTIONS USING ENCRYPTED TOKENS

FIELD

The present disclosure relates to the processing of transactions initiated by a consumer rather than a merchant utilizing encrypted tokens, specifically the use of encrypted tokens delivered by a user device to a point of sale for use in a transaction initiated by the user where the payment information is not exposed to the merchant during processing, including for the processing of blockchain transactions utilizing traditional payment infrastructure.

BACKGROUND

As the use of mobile devices by consumers have become more prevalent, the features provided by mobile devices have increased. One feature that has been developed for mobile devices has been the ability to use the device as a digital wallet, where the device stores payment credentials for a transaction account and electronically transmits the credentials to a point of sale for use in a transaction as an alternative to the presentation of a payment card or other payment instrument. However, methods of transmission may often place the payment credentials at risk. As a result, some systems have been developed that utilize tokens in place of payment credentials, where a token is associated with payment credentials and is mapped thereto by a back-end server during the processing of the transaction. In many instances, the token is generated and managed by a token service provider (TSP), which can de-tokenize the token to obtain underlying account number for use during the processing of the payment transaction.

However, as the token itself is exposed to the merchant, the token itself may be subject to compromise. In addition, there is opportunity for the token to be exchanged or replaced during processing or for other fraudulent activity to occur. As such, existing systems that have been developed that utilize tokens have potential for fraud to occur. For example, an intermediate device may intercept the token and stop the transaction, and then use the token for a later transaction. In such a manner, even tokens that are generated for only a single use may still be subject to theft. To be clear, though reducing fraud is an underlying motivation, this is a technical problem needing a technical solution.

Thus, there is a need for a technical solution where a computing device may be used to initiate a payment transaction where payment credentials may be conveyed to a point of sale for use in the transaction that are protected from exposure to the point of sale while also being resistant to fraud.

SUMMARY

The present disclosure provides a description of systems and methods for consumer-initiated transactions using encrypted tokens. A user device includes an account token that may be used as a payment credential for a transaction account, and generates a transaction order for a transaction, where the transaction order is used in the generation of a cryptographic checksum. The user device creates a payment token that includes the account token, which is then encrypted and provided to a point of sale with the cryptographic checksum. This data is forwarded along by the point of sale to a payment network for processing, where the point of sale is unable to decrypt the payment token and where any modification to the transaction is prevented via use of the checksum. In some cases, the same processing methods may be used to convey details for blockchain transactions, which may utilize traditional payment networks, increasing security of data transmission while also protecting the sensitive transaction data via use of the encrypted token and cryptographic checksum. Thus, payment transactions conducted using the methods and systems discussed herein have greater security and reduced likelihood of fraud than transactions conducted using traditional systems.

In the systems and methods discussed herein, a user device can be used to initiate a payment transaction, where payment credentials may be conveyed to a point of sale for use in the transaction that are protected from exposure to the point of sale while also being resistant to fraud, while, at the same time, minimizing costs of implementation to all parties involved. By utilizing existing payment network infrastructure, merchants, acquirers, issuers, and other entities involved in the processing of payment transactions can take advantage of the methods and systems discussed herein with minimal modification to legacy systems, resulting in easy and efficient adoption, without affecting their processing costs, and at the same time receiving the benefits discussed herein. Such a solution also allows consumers to benefit from value added services, such as earning or consuming loyalty points, converting transactions to installments, push payments, etc.

The use of a blockchain provides further benefits that accommodates payments and currency transfers faster and at less expense for participating entities. As discussed herein, the methods and systems enable the consumer to be a part of the transaction including the use of blockchain and also reduces the likelihood of fraud for transactions by ensuring consumer consent while also reducing merchant fraud and reconciliation errors. In addition, the consumer may make a bilateral transaction with any merchant and using any type of digital currency, without requiring a point of sale terminal. The use of a blockchain also provides for transparency as all transactions may be tracked and associated with a cryptographic key pair to assist in reporting, auditing, and record keeping, while also not requiring the consumer themselves to possess a private key, which can greatly increase account security for blockchain wallets. The blockchain may also facilitate faster settlement and reduce costs incurred by the consumer with respect to participating in electronic payment transactions. The methods and systems discussed herein may also be applied to payment transactions across multiple product types and currency types.

A method for consumer-initiated transactions with encrypted tokens includes: storing, in a memory of a computing device, at least a first cryptographic key pair comprising an account public key and an account private key, a merchant public key, an account token associated with a transaction account, an account identifier, and an issuing institution identifier; receiving, by the computing device, transaction data for a proposed payment transaction including at least a transaction amount; generating, by a generation module of the computing device, a transaction order, wherein the transaction order includes at least the transaction data; generating, by the generation module of the computing device, a cryptographic checksum for the generated transaction order; generating, by the generation module of the computing device, a digital signature over the cryptographic checksum using the account private key; generating, by the generation module of the computing device, a payment token, wherein the payment token includes at least the issuing institution identifier, the account identifier, the transaction amount, and the account token; encrypting, by an encryption module of the computing device, the payment token using the account private key; and electronically transmitting, by a transmitting device of the computing device, the encrypted payment token and signed cryptographic checksum to a point of sale device.

A system for consumer-initiated transactions with encrypted tokens includes: a memory of a computing device configured to store at least a first cryptographic key pair comprising an account public key and an account private key, a merchant public key, an account token associated with a transaction account, an account identifier, and an issuing institution identifier; a receiving device of the computing device configured to receive transaction data for a proposed payment transaction including at least a transaction amount; a generation module of the computing device configured to generate a transaction order, wherein the transaction order includes at least the transaction data, generate a cryptographic checksum for the generated transaction order, generate a digital signature over the cryptographic checksum using the account private key, and generate a payment token, wherein the payment token includes at least the issuing institution identifier, the account identifier, the transaction amount, and the account token; an encryption module of the computing device configured to encrypt the payment token using the account private key; and a transmitting device of the computing device configured to electronically transmit the encrypted payment token and signed cryptographic checksum to a point of sale device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
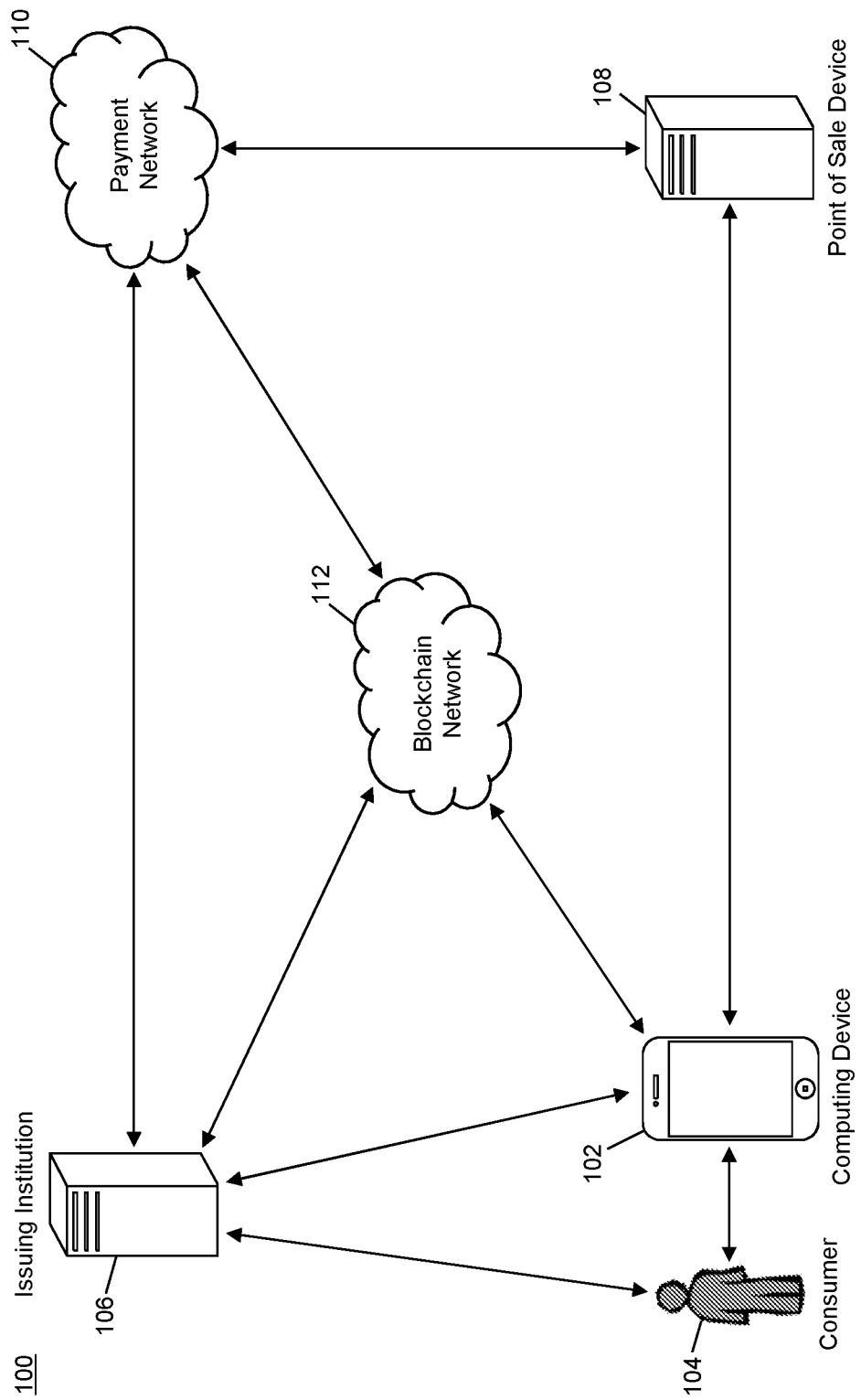
FIG. 1 is a block diagram illustrating a high level system architecture for consumer-initiated transactions with encrypted tokens in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Payment networks may also provide value added services related to payment transactions, including operation as a token service provider for the use of tokenized payment credentials. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by Mastercard®, PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity. As used herein, "merchant server" may refer to computing systems and other infrastructure configured to perform the functions of a merchant or operate in the assistance thereof.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., electronic terminal, a cash register, kiosk, desktop computer, smart phone, tablet computer, etc.) in a physical location that a customer visits as part of the transaction, such as in a "brick and mortar" store, or may be virtual in e-commerce (online payment) environments, such as online retailers receiving communications from customers over a network such as the Internet where the point of sale may be considered to be a merchant website. In instances where the point of sale may be virtual, the computing device operated by the user to initiate the transaction or the computing system that receives data as a result of the transaction may be considered the point of sale, as applicable.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Consumer-Initiated Transactions with Payment Tokens

FIG. 1 illustrates a system 100 for the conducting of electronic payment transactions that are initiated by a consumer device and utilize a combination of an encrypted payment token and a cryptographic checksum to increase security and reduce likelihood of fraud.

The system 100 may include a computing device 102. The computing device 102, discussed in more detail below, may be a device used by a consumer 104 to initiate a payment transaction and, as part of the initiation of the payment transaction, convey an encrypted payment token and signed cryptographic checksum to a point of sale device 108 of a merchant for use in the processing of the payment transaction. The computing device 102 may be any type of computing device that is specifically configured to perform the functions discussed herein, such as a specially configured desktop computer, laptop computer, notebook computer, tablet computer, cellular phone, smart phone, smart watch, smart television, wearable computing device, implantable computing device, etc.

In the system 100, an issuing institution 106 may be configured to issue a transaction account to the consumer 104 for use in funding electronic payment transactions. The issuing institution 106 may be a financial institution, such as an issuing bank, or other entity configured to issue transaction accounts. As part of the issuing of the transaction account to the consumer 104, the issuing institution 106, or another entity acting on behalf of the issuing institution 106, may provision an account token to the computing device 102 using a suitable method. The account token may be a digital token that can be used in place of traditional payment credentials (e.g., a primary account number and other accompanying data) in a payment transaction, and serve as payment credentials in such an instance. Traditionally, an account token, when used in a payment transaction, may be mapped to the corresponding primary account number, and other payment credentials, if applicable, by a payment network 110 or the issuing institution 106 during the processing of the payment transaction. In some cases, an account token may be limited in use, such as in the number of transactions it may be used for, the merchants it may be used at, the channel (e.g., in store, online, etc.) it may be used at, the device or digital wallet on which it could be used with, or other transaction controls that may be placed thereon. In some embodiments, account tokens may be generated and/or provisioned to computing devices 102 by a separate entity, which may be referred to herein as a token service provider. In some cases, the issuing institution 106 may include a token service provider. In other cases, the issuing institution 106 may communicate with the token service provider (e.g., to provide payment credentials or other account information) to facilitate the provisioning of account tokens.

In the system 100, the computing device 102 may store the account token, and any single use keys or session keys associated therewith, in a memory or other suitable type of storage therein. For instance, the computing device 102 may include a secure element, trusted execution environment, or other type of secured storage that may be configured to store the account token and any associated keys. The computing device 102 may also include a cryptographic key pair comprised of a public key and private key, referred to herein as the "account" public key and "account" private key. The cryptographic key pair may be generated using any suitable type of key generation algorithm such as disclose in Recommendation for Cryptographic Key Generation by Elaine Barker and Allen Roginsky, NIST Special Publication 800-133, http://dx.doi.org/10.6028/NIST.SP.800-133, December 2012, for example, and may, in some embodiments, be an asymmetric key pair. In some embodiments, the issuing institution 106 may issue the account key pair to the computing device 102. In other embodiments, the key pair may be generated by the computing device 102, where the account public key may be provided to the issuing institution 106 for association with the transaction account.

To begin the process of initiating a payment transaction, the computing device 102 may receive transaction data for the proposed payment transaction. In some embodiments, the consumer 104 may manually input the transaction data into the computing device 102 using a suitable input device interfaced therewith. In other embodiments, the computing device 102 may receive the transaction data from the point of sale device 108 associated with a merchant with whom the consumer 104 wants to transact. In some instances, transaction data may be both input by the consumer 104 and received from the point of sale device 108. For example, the point of sale device 108 may electronically transmit the transaction data to the computing device 102 via near field communication, the Internet, an application programming interface, or other suitable method. In another example, transaction data could be encoded in a machine-readable code (e.g., a quick response code, bar code) that could be displayed on or near the point of sale device 108 that, where the computing device 102 could read the machine-readable code to obtain the transaction data encoded therein. The transaction data may include at least a transaction amount, but may also include additional data regarding the proposed electronic payment transaction, such as a currency type, a merchant identifier associated with the merchant corresponding to the point of sale device 108, tip amount (e.g., if applicable), a device identifier of the point of sale device 108, a product identifier associated with each product being purchased in the proposed transaction, number of installments, etc. In some cases, some transaction data, such as transaction amount and tip amount, may be provided by the consumer 104 via an input device interfaced with the computing device 102 following receipt of transaction data from the point of sale device 108.

The computing device 102 may receive the transaction data and may generate a transaction order for the transaction, also referred to herein as a purchase order. The transaction order may include at least the transaction data. In some cases, the transaction order may also include identification data associated with the consumer 104, such as an account identifier associated with the transaction account to be used to fund the electronic payment transaction or other suitable type of identification value, such as a username, e-mail address, telephone number, identification number, name, etc. In some embodiments, the transaction order may also include a transaction identifier, which may be generated by the computing device 102 (e.g., a digital wallet application program used in the receipt and storage of payment credentials). In some instances, a transaction identifier may include additional data, such as the merchant identifier, product identifier, and the account identifier or other information suitable for identification of the consumer 104 and/or the transaction account used to fund the payment transaction. The transaction order may also include a nonce, which may be generated randomly or pseudo-randomly by the computing device 102 using suitable methods.

Once the transaction order is generated, the computing device 102 may generate a cryptographic checksum for the transaction order. In some embodiments, the cryptographic checksum may be generated via hashing the transaction order, which may be performed by applying one or more hashing algorithms to the transaction order, where the hashing algorithm(s) applied and the order of application thereof may be predetermined by the computing device 102 and, in some cases, known to the issuing institution 106. For instance, as part of the provisioning of the account token to the computing device 102, the issuing institution 106 (e.g., or a third party, such as a token service provider, chip manufacturer, wallet service provider, mobile device vendor, payment network, etc., as applicable) may also specify the hashing algorithms and order of application to the computing device 102 for use in generating the cryptographic checksum of the transaction order. In some cases, such data may be stored in the computing device 102, such as in a digital wallet application program used in the storage and conveyance of the account token. In an exemplary embodiment, the computing device 102 may also digitally sign the cryptographic checksum using the account private key.

Following generation and signing of the cryptographic checksum, the computing device 102 may generate a payment token. The payment token may include at least the account token, data identifying the transaction account, and the transaction amount for the payment transaction. In some cases, the payment token may also include information identifying the consumer 104 and/or an indication of the currency used in the payment transaction. In some embodiments, the payment token may also include information identifying the issuing institution 106, such as an issuer identification number, bank identification number, routing number, or other suitable value that may be used by the point of sale device 108 and/or payment network 110 in identifying the issuing institution 106 during processing of the payment transaction.

Once the payment token is generated, the computing device 102 may encrypt the payment token using the account private key. In some embodiments, a separate private key of a different cryptographic key pair may be used to encrypt the payment token. The encrypted payment token may then be electronically transmitted to the point of sale device 108 by the computing device 102 along with the signed cryptographic checksum using any suitable communication method. For instance, the computing device 102 may electronically transmit the data to the point of sale device 108 via Bluetooth, near field communication, radio frequency, cellular communication, the Internet, in a machine-readable code readable by the point of sale device 108, etc.

The point of sale device 108 may receive the encrypted payment token and signed cryptographic checksum. In some cases, the encrypted payment token may also include, or may be accompanied by, any additional cryptograms or other data used in the processing of a payment transaction, such as an application cryptogram generated using single use key or session keys, which may be used in generated using methods and systems that will be apparent to persons having skill in the relevant art. An application cryptogram may contain additional information related to the transaction, the consumer 104, or the computing device 102, such as device data (e.g., device identifier, operating system information, etc.), geographic location, transaction time and/or date, cardholder verification method data, transaction type, etc. In some embodiments, the point of sale device 108 may be configured to verify the signature of the cryptographic checksum. In such embodiments, the point of sale device 108 may receive the account public key directly from the computing device 102 (e.g., in the same or a separate transmission) or may receive the account public key from a third party source, such as the issuing institution 106, token service provider, or other entity. The digital signature may be verified using the account public key via the algorithm used by the computing device 102 in generating the digital signature. In some embodiments, the merchant may also digitally sign the cryptographic checksum using its own private key of a cryptographic key pair associated therewith, referred to herein as the "merchant" private key and "merchant" public key.

In some embodiments, the computing device 102 may provide the transaction order to the point of sale device 108 with the encrypted payment token and the cryptographic checksum. In such embodiments, the point of sale device 108 may be configured to also digitally sign the transaction order. In such an embodiment, the digitally signed transaction order may be electronically transmitted with encrypted product data (e.g., encrypted via the merchant private key), the signed cryptographic checksum, and, in some instances, an additional random value, which may also be encrypted (e.g., using the merchant private key) and accompanied by its own cryptographic checksum. In some cases, the point of sale device 108 may be first configured to verify the cryptographic checksum, such as by generating its own value using the transaction order and comparing it to the cryptographic checksum provided by the computing device 102. In these cases, the point of sale device 108 may not digitally sign the transaction order until the cryptographic checksum is validated and may, in some cases, stop the processing of the transaction if the validation is unsuccessful.

The point of sale device 108 may then submit the data to a payment network 110, either directly or via one or more intermediate entities (e.g., acquirers, gateway processors, etc.) for processing of the electronic payment transaction, meaning that a trusted and secure network can be re-tasked to perform this function at advantage over other network protocols such as HTTPS without requiring substantial changes to the message format or infrastructure. In instances where the data may be submitted through an acquirer, the acquirer may endorse the merchant by verifying the digital signature using the merchant's public key. In other instances, the issuing institution 106 may be able to validate the merchant. In an exemplary embodiment, the data may be included in a transaction message that is submitted to the payment network 110 via payment rails associated therewith, where the transaction message may be formatted pursuant to one or more standards governing the exchange of transaction messages as used in traditional payment transactions, such as the International Organization of Standardization's ISO 8583 or ISO 20022 standards. In these embodiments, the transaction message may include a message type indicator indicative of an authorization request, and may include a plurality of data elements, where one data element is configured to store the encrypted payment token and another data element is configured to store the signed cryptographic checksum. In some cases, the encrypted payment token may be stored in the data element configured to store the primary account number. In other cases, the encrypted payment token may be stored in a data element configured for the storage of token data, such as data element 60 in ISO 8583, where an account number of the payment token may be stored in the data element configured to store the primary account number (e.g., data element 2 in ISO 8583). The signed cryptographic checksum may be stored in a data element reserved for private use as indicated by the applicable standard(s). In embodiments where the point of sale device 102 receives the transaction order, the signed transaction order may be stored in a data element included in the transaction message that is reserved for private use as indicated by the applicable standard(s).

The payment network 110 may receive the transaction message for the electronic payment transaction. The encrypted payment token may be decrypted by the payment network 110, issuing institution 106, or another trusted entity, such as the token service provider. For instance, the system 100 may include a trusted service manager that may be configured to store account public keys for provisioning to point of sale devices 108 and use in decrypting encrypted payment tokens. In such embodiments, the payment network 110 may forward the transaction message to the trusted service manager, which may decrypt the encrypted payment token and then forward the transaction message, with the payment token decrypted, to the issuing institution 106 (e.g., identified via the identification data in the now-decrypted payment token). In other embodiments, the trusted service manager may decrypt the payment token and return the decrypted payment token to the payment network 110, which may then forward the transaction message, with the now-decrypted payment token, to the appropriate issuing institution 106. In some embodiments, the account token included in the decrypted payment token may be mapped to the corresponding transaction account payment credentials by the payment network 110, the trusted service manager, or a third party system configured to perform such functions. In other embodiments, the issuing institution 106 may perform the mapping of the account token. In instances where the encrypted payment token may be stored in a data element in the transaction message separate from an account number of the payment token, the encrypted payment token may be decrypted by the issuing institution 106 and the trusted service manager may perform mapping to replace the token account number with the primary account number of the transaction account. In these instances, the encrypted payment token may include the token account number or the primary account number.

The issuing institution 106 may receive the transaction message that includes the decrypted payment token. The issuing institution 106 may first verify the digital signature of the cryptographic checksum, and of the transaction order, if applicable, using the merchant public key. In one embodiment, the merchant public key may be included in the transaction message by the point of sale device 108. In another embodiment, the merchant public key may be provided to the issuing institution 106 separately by the point of sale device 108, the associated merchant, or the payment network 110. In other embodiments, the trusted service manager may be configured to store merchant public keys and may provide the merchant public key associated with the point of sale device 108 to the issuing institution 106. The issuing institution 106 may also verify the digital signature of the cryptographic checksum of the computing device 102 using the account public key. In one embodiment, the issuing institution 106 may receive the transaction message that includes the encrypted payment token and de-tokenized account information (e.g., after mapping). In such an embodiment, the issuing institution 106 may decrypt the encrypted payment token, verify the digital signature of the cryptographic checksum, as well as the transaction order, if applicable, using the merchant public key.

In addition to verification of the digital signatures, the issuing institution 106 may verify the cryptographic checksum. In cases where the transaction order is included in the transaction message, the issuing institution 106 may verify the cryptographic checksum accordingly, such as by generating its own value using the transaction order and comparing it to the cryptographic checksum. In other cases, the computing device 102 may provide the transaction order to the issuing institution 106 as part of the initiation of the electronic payment transaction, where the issuing institution 106 may use the transaction order from the computing device 102 to verify the cryptographic checksum included in the transaction message.

If all verifications are successful, the issuing institution 106 may process the financial transaction using any traditional methods, such as by ensuring that the transaction account has sufficient credit to cover the transaction amount, etc. If any verifications are unsuccessful, or if the transaction is unable to be approved for any other reason (e.g., insufficient balance, suspended account, blocked account, etc.), then the payment transaction may be declined. The issuing institution 106 may modify the transaction message or generate a new transaction message based thereon that is an authorization response that includes a response code indicating if the payment transaction is approved or denied. The authorization response may be electronically transmitted to the payment network 110 using the payment rails associated therewith, which may forward the authorization response to the point of sale device 108 (e.g., directly or via an intermediate entity, such as an acquirer) for finalizing of the transaction. For instance, if the transaction is approved, the point of sale device 108 may provide the computing device 102 and/or consumer 104 with the transacted-for product(s) (e.g., which may be indicated in the transaction order). In embodiments where the product may be delivered electronically, the product may be digitally signed using the merchant private key, which may be verified by the computing device 102 upon receipt using the merchant public key (e.g., received from the point of sale device 108 or the trusted service manager).

In some embodiments, the decrypted payment token may be included in the authorization response, where the inclusion of the decrypted payment token may be used by the point of sale device 108 to verify approval of the payment transaction and the data included therein. The decrypted payment token may be inserted into the authorization response by the issuing institution 106 or by another suitable entity (e.g., a token service provider). For instance, the point of sale device 108 may verify that the transaction amount included in the decrypted payment token matches the transaction amount in the transaction order and that was included in the authorization request, if applicable. In other embodiments, the payment token may be re-encrypted or replaced with the initially encrypted payment token, by the payment network 110, issuing institution 106, trusted service manager, or other suitable entity, prior to the forwarding of the authorization response to the point of sale device 108. In such embodiments, the response code stored in the corresponding data element included in the authorization response may be sufficient for the point of sale device 108 to finalize the payment transaction.

The use of the encrypted payment token combined with the cryptographic checksum may ensure that the transaction account may not be compromised, even if the encrypted payment token and/or cryptographic checksum are intercepted, as the checksum is digitally signed by the computing device 102, which cannot be spoofed, and corresponds to a transaction order that specifies the identity of the account, the identity of the merchant, and the transaction amount, ensuring that the transaction cannot be processed successfully unless for the transaction as originally intended by the consumer 104. In addition, the digital signatures used by the computing device 102 and point of sale device 108 provide further security as the issuing institution 106 will not approve any transaction where the computing device 102 or point of sale device 108 are not genuine. Furthermore, the encryption of the payment token protects the transaction account from compromise as the account token included therein may not be intercepted or used in any unauthorized transactions. As a result, the security of transaction accounts and payment transactions generally is significantly increased over traditional methods and systems.

In some embodiments, the system 100 may be further configured to utilize a blockchain network 112 for additional security in the storage of data for use in the system 100. The blockchain network 112 may be comprised of a plurality of nodes, which may be configured to generate, validate, and store blocks comprising a blockchain associated with the blockchain network 112. The blockchain may be comprised of a plurality of blocks, where each block includes at least a block header and one or more blockchain transaction data values. A block header may include at least a timestamp when the block header was generated, a block reference value, and a transaction reference value. The block reference value may be a reference to a prior block added to the blockchain, such as the block header in the most recent block (e.g., based on timestamp) added to the blockchain. The transaction reference value may be a reference to the blockchain transaction data values included in the respective block. In an exemplary embodiment, each reference value may be generated via the hashing of the respective data. As a result, the use of the reference values may ensure immutability of the blockchain as no data value could be modified without also modifying that block's transaction reference value and then the block reference value included in every subsequent block in the blockchain, which must be performed at every node in the blockchain network 112 faster than the time in which a new block is generated and added to the blockchain.

In some embodiments, blockchain transaction data values may be used to store data used in the processing of payment transactions as discussed herein. For instance, the computing device 102 may submit the signed cryptographic checksum and/or transaction order to a node in the blockchain network 112 for storage in a new block. The issuing institution 106 may be able to view the data on the blockchain to ensure that the transaction order and/or signed cryptographic checksum is not tampered with for additional security when verifying a received authorization request. In another embodiment, the issuing institution 106 or payment network 110 may submit the signed cryptographic checksum (e.g., by the computing device 102 and/or the point of sale device 108) or the transaction order (e.g., unsigned or signed by the point of sale device 108) to the blockchain network 112 for inclusion in a new block. In such embodiments, the computing device 102 may be able to verify the transaction order, the cryptographic checksum, and/or the digital signatures thereon to verify that the data was not modified during processing by the point of sale device 108 or in transmission to the payment network 110.

In some cases, the system 100 may be used in the processing of blockchain transactions in a blockchain network 112. In such cases, the blockchain network 112 may be configured to store data associated with cryptographic currencies and transactions for the transfer thereof. In these cases, the computing device 102 may be an electronic wallet that has access to cryptographic currency held in the blockchain associated with the blockchain network 112. In traditional blockchain transactions, the computing device 102 may submit transaction data directly to a node in the blockchain network 112 for the blockchain transaction, which may include a sending address corresponding to a location accessible by the computing device 102 that has cryptographic currency to transfer, a receiving address corresponding to an entity (e.g., the point of sale device 108) to which the currency is to be transferred, the amount to be transferred, and a digital signature generated by the computing device 102 (e.g., via the account private key or other suitable key) that proves control of the currency being transferred.

In the system 100, the sending address or addresses and the receiving address may be included in the transaction order in place of the consumer/account identifier and the merchant identifier, where the digital signature that proves access to the sending address or addresses may replace the account token. Alternatively, tokenization may be used in mapping the sending address (e.g., the blockchain address of the consumer 104) to the token account number. The token account number could be stored in the corresponding data element in the transaction message, while the sending address may be stored in the payment token. In such an embodiment, the transaction message may be used to submit data associated with a blockchain transaction through the payment rails associated with a payment network 110, which may be more secure and reliable than any connection to the blockchain network 112 that may be attempted directly by the computing device 102. In addition, such a configuration could enable blockchain transactions to be performed using payment rails associated with the payment network 110. In these embodiments, the payment network 110 may submit the data included in the transaction message to a node in the blockchain network 112, which may perform the verifications discussed above and, if successful, may process the blockchain transaction using the included data. In some embodiments, the payment network 110 itself may be a node in the blockchain network 112 and may perform the associated functions. As a result, the system 100 may provide for increased security and reliability to blockchain transactions in addition to standard electronic payment transactions, while also leveraging existing payments infrastructure. The methods discussed herein also facilitate the use of multiple types of payment instruments and transaction accounts, such as for the use of credit cards, debit cards, prepaid cards, etc., as well as enable issuing institutions 106 to support multiple consumers 104 in the system 100, and for acquiring institutions to support multiple merchants.

Computing Device

Figure 2:
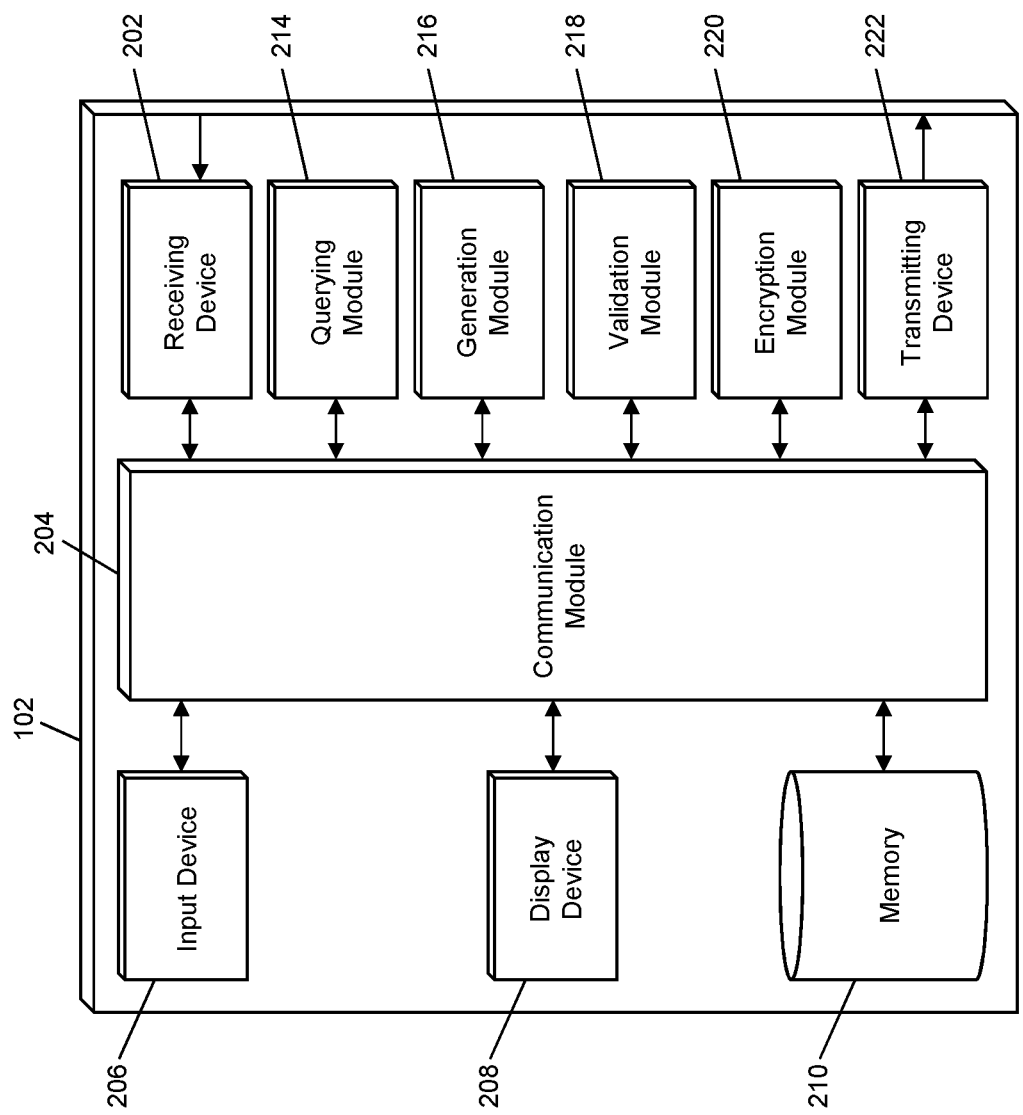
FIG. 2 is a block diagram illustrating the computing device of the system of FIG. 1 for the generation and encryption of payment tokens and use thereof in initiating payment transactions in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 600 illustrated in FIG. 6 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from issuing institutions 106, point of sale devices 108, blockchain networks 112, and other systems and entities via one or more communication methods, such as radio frequency, near field communication, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106, which may be superimposed or otherwise encoded with an account token associated with a transaction account for use in funding a payment transaction. Such signals may also include identification data associated with the issuing institution 106 and any other data associated with the transaction account issued to the consumer 104, such as the account key pair. The receiving device 202 may also be configured to receive data signals electronically transmitted by point of sale devices 108, which may be superimposed or otherwise encoded with transaction data, signed product data, etc. The receiving device 202 may also be configured to receive data signals electronically transmitted by nodes in the blockchain network 112, which may be superimposed or otherwise encoded with blockchain data including blockchain transaction data values, which may include signed cryptographic checksums, transaction orders, or other data for use by the computing device 102 in verifying an electronic payment transaction.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, encryption module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 206. The input devices 206 may be internal to the computing device 102 or external to the computing device 102 and connected thereto via one or more connections (e.g., wired or wireless) for the transmission of data to and/or from. The input devices 206 may be configured to receive input from a user of the computing device 102, such as the consumer 104, which may be provided to another module or engine of the computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive transaction data submitted by the consumer 104 that includes a merchant identifier, transaction amount, product identifier, etc., for a proposed payment transaction.

The computing device 102 may also include or be otherwise interfaced with a display device 208. The display device 208 may be internal to the computing device 102 or external to the computing device 102 and connected thereto via one or more connections (e.g., wired or wireless) for the transmission of data to and/or from. The display device 208 may be configured to display data to a user of the computing device 102, such as the consumer 104. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 208. The display device 208 may be configured to, for example, display transaction data received from the point of sale device 108, results of verifications of checksums and digital signatures, etc.

The computing device 102 may also include a memory 210. The memory 210 may be configured to store data for use by the computing device 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store a cryptographic key pair associated with the transaction account, which may be comprised of an account private key and an account public key. The memory 210 may also be configured to store session keys, single use keys, or other data to be included in or used in conjunction with an account token. In some embodiments, the memory 210 may be, or may include, a secure element, trusted execution environment, or other secure storage that may include some or all of the data used in the methods discussed herein. The memory 210 may also be configured to store any additional data used in performing the functions discussed herein, such as a merchant public key, signature algorithms, key generation algorithms, blockchain data, merchant identifiers, issuing institution identifiers, etc.

The computing device 102 may include a querying module 214. The querying module 214 may be configured to execute queries on databases to identify information. The querying module 214 may receive one or more data values or query strings, and may execute a query string based thereon on an indicated database, such as the memory 210, to identify information stored therein. The querying module 214 may then output the identified information to an appropriate engine or module of the computing device 102 as necessary. The querying module 214 may, for example, execute a query on the memory 210 to identify a hashing algorithm for generating a cryptographic checksum over a transaction order and to identify the account private key for use in generating a digital signature over the cryptographic checksum.

The computing device 102 may also include a generation module 216. The generation module 216 may be configured to generate data for use by the computing device 102 in performing the functions discussed herein. The generation module 216 may receive instructions as input, may generate data based on the instructions, and may output the generated data to another module or engine of the computing device 102. In some cases, the generation module 216 may also receive data to use in the generation as input. In other cases, the generation module 216 may be configured to identify such data. In an example, the generation module 216 may be configured to generate a transaction order that includes transaction data including an account identifier, a merchant identifier, a transaction amount, etc. The generation module 216 may also be configured to generate a payment token that includes an account token, issuing institution identifier, account identifier, and transaction amount. The generation module 216 may also be configured to generate digital signatures over data using the account private key and suitable signature algorithms.

The computing device 102 may also include a validation module 218. The validation module 218 may be configured to validate and verify data for use in performing the functions of the computing device 102 as discussed herein. The validation module 218 may receive data to be validated as input, may attempt to validate the data, and may provide results of the attempt to another module or engine of the computing device 102. For example, the validation module 218 may be configured to validate digital signatures generated by point of sale devices 108, validate digital signatures generated by the computing device 102, validate cryptographic checksums based on transaction orders or data associated therewith, etc.

The computing device 102 may also include an encryption module 220. The encryption module 220 may be configured to encrypt and decrypt data for use in performing the functions of the computing device 102 as discussed herein. The encryption module 220 may be configured to receive data to encrypt or decrypt as input, may perform the requisite functions, and may output the resulting data to another module or engine of the computing device 102. For example, the encryption module 220 may be configured to encrypt a payment token generated by the generation module 216 for use in an electronic payment transaction.

The computing device 102 may also include a transmitting device 222. The transmitting device 222 may be configured to transmit data over one or more networks via one or more network protocols. In some instances, the transmitting device 222 may be configured to transmit data to issuing institutions 106, point of sale devices 108, blockchain networks 112, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to issuing institutions 106 that are superimposed or otherwise encoded with requests for account data, transaction orders, account public keys, or other data as discussed herein. The transmitting device 222 may also be configured to electronically transmit data signals to point of sale devices 108, which may be superimposed or otherwise encoded with an encrypted payment token and signed cryptographic checksum, and may also include a transaction order, which may also be signed. The transmitting device 222 may be further configured to electronically transmit data signals to a node in a blockchain network 112, which may be superimposed or otherwise encoded with data for submission to the blockchain, such as a signed cryptographic checksum or a transaction order (e.g., signed or unsigned), which may be used by the issuing institution 106 during processing of a payment transaction.

Processing of a Consumer-Initiated Transaction with an Encrypted Payment Token

Figure 3A:
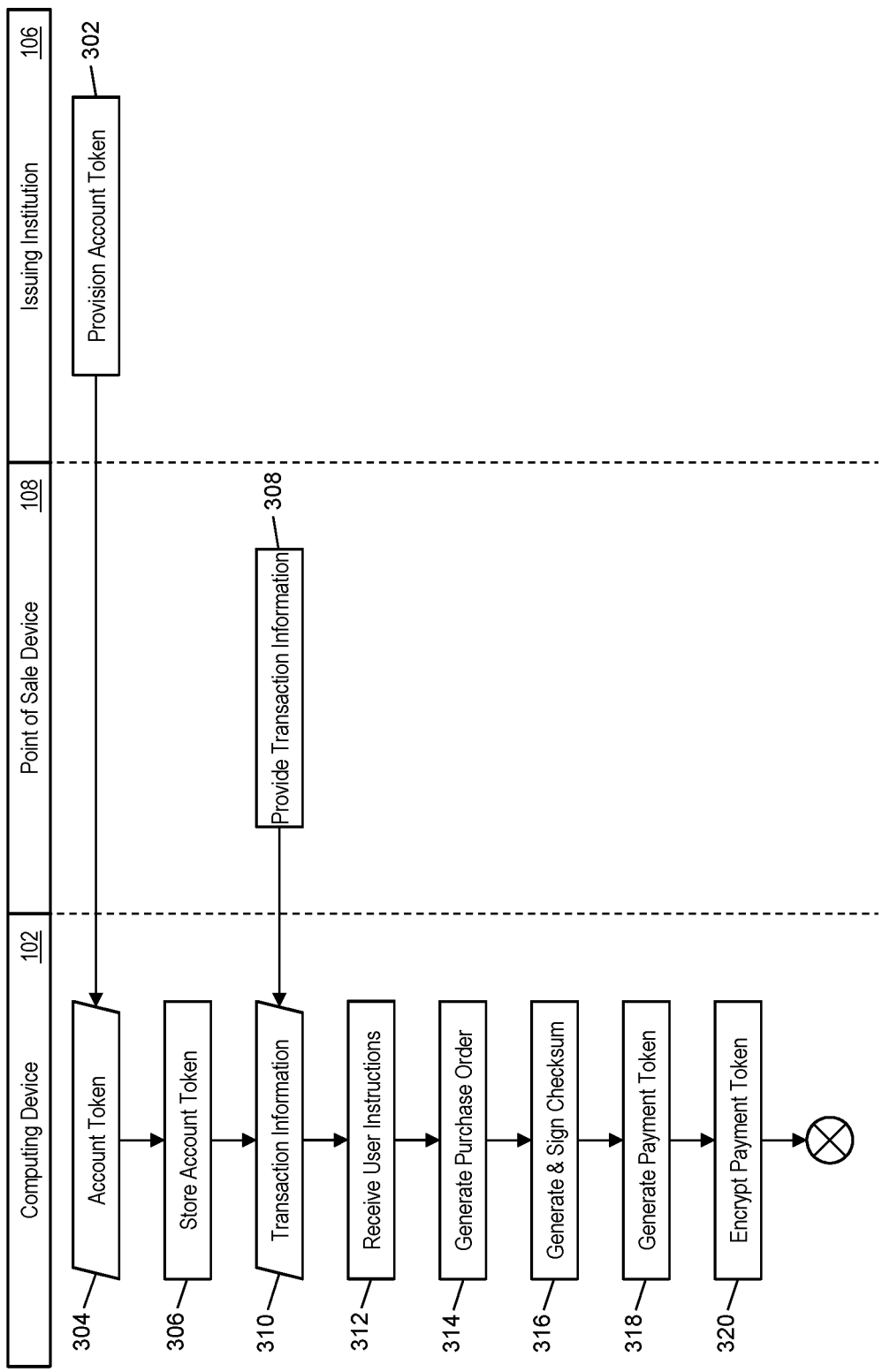
FIGS. 3A and 3B are a flow diagram illustrating a process for the conducting of consumer-initiated transactions using encrypted tokens and cryptographic checksums using the system of FIG. 1 in accordance with exemplary embodiments.
Figure 3B:
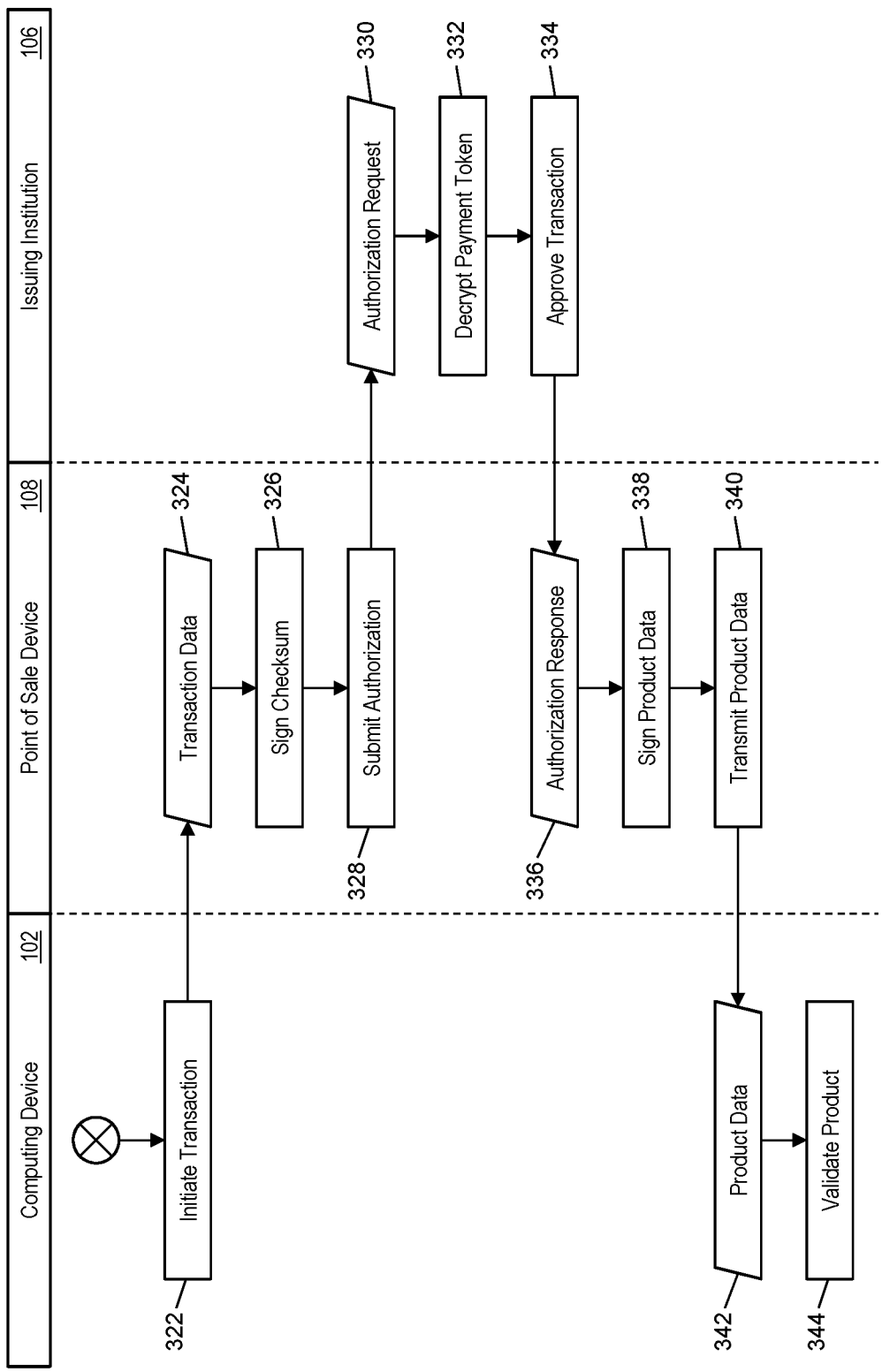

FIGS. 3A and 3B illustrate a process for the processing of a consumer-initiated electronic payment transaction in the system 100 of FIG. 1 that utilizes an encrypted payment token and cryptographic checksum.

In step 302, the issuing institution 106 (e.g., or a token service provider or other entity, as applicable) may provision an account token to the computing device 102 using a suitable method. The account token may serve as payment credentials for an associated transaction account, but may not include the primary account number associated with the transaction account. In step 304, the receiving device 202 of the computing device 102 may receive the account token. In step 306, the querying module 214 of the computing device 102 may execute a query on the memory 210 of the computing device 102 to insert the account token therein. In some cases, the account token may be stored in a secure element, trusted execution environment, or other secure storage in the memory 210. In some embodiments, the account token may be provisioned to a third party system for storage and later retrieval by the computing device 102, such as using cloud-based storage or other suitable techniques.

In step 308, the point of sale device 108 may electronically transmit transaction data to the computing device 102 using a suitable communication method. For instance, an employee of the merchant associated with the point of sale device 108 may scan products for purchase, which may cause the point of sale device 108 to generate transaction data for a proposed payment transaction, which may then be transmitted to the computing device 102 using near field communication, the reading of a machine-readable code encoded with the transaction data by the computing device 102, or other suitable method. In step 310, the receiving device 202 of the computing device 102 may receive the transaction data, which may include at least the transaction amount for the payment transaction. For in-store transactions, the computing device 102 may receive the transaction data directly from the point of sale device 108 (e.g., and input by the consumer 104 via the input device 206 of the computing device 102, as applicable). For e-commerce or other online or remote transactions, the transaction data may be transmitted through one or more intermediate systems or networks, such as via a web server over the Internet from a merchant website as the point of sale device 108. In some embodiments, the transaction data may also include a merchant identifier, currency type, tip amount (e.g., if applicable), number of installments, a transaction identifier, and product identifier(s). In step 312, the computing device 102 may receive (e.g., via the input device 206), user instructions to initiate the payment transaction. In some cases (e.g., if the user scans a machine-readable code with no transaction amount provided), the user instructions may include updates or additions to the transaction amount (e.g., to add a tip). In such cases, the transaction amount may be updated accordingly based on the user input.

In step 314, the generation module 216 of the computing device 102 may generate a purchase order for the transaction. The purchase order may include at least the transaction data received from the point of sale device 108. In some embodiments, an account identifier associated with the transaction account to be used to fund the payment transaction may also be included in the purchase order. In step 316, the generation module 216 of the computing device 102 may generate a cryptographic checksum of the purchase order using a suitable hashing algorithm applied thereto and may also generate a digital signature over the checksum using the account private key stored in the memory 210 of the computing device 102 (e.g., and identified via the querying module 214 thereof).

In step 318, the generation module 216 of the computing device 102 may generate a payment token. The payment token may include at least the account token received for the transaction account, an account identifier associated with the transaction account (e.g., which may also be provided by the issuing institution 106 or selected by the consumer 104), an identifier associated with the issuing institution 106, and the transaction amount. In some cases, the payment token may also include account information (e.g., blockchain address, account number, account reference, etc.), information identifying the consumer 104, transaction currency type, etc. In step 320, the encryption module 220 of the computing device 102 may encrypt the payment token using the account private key. In step 322, the computing device 102 may initiate the payment transaction by electronically transmitting the encrypted payment token and signed cryptographic checksum to the point of sale device 108. In some embodiments, the transmission may also include the purchase order. In some cases, the purchase order may be submitted to the blockchain network 112 for addition into the blockchain associated therewith.

In step 324, the point of sale device 108 may receive the encrypted payment token and cryptographic checksum, and the purchase order, if applicable. In step 326, the point of sale device 108 may generate its own digital signature over the cryptographic checksum, which may be over the signed checksum or over the unsigned checksum. In some cases, the point of sale device 108 may first verify the computing device's digital signature over the checksum using the account public key prior to generating its own digital signature. In step 328, the point of sale device 108 may submit an authorization request for the payment transaction to the issuing institution 106 via the payment network 110 (e.g., directly or via an intermediate entity, such as an acquirer) using payment rails associated therewith. The authorization request may include at least the encrypted payment token and the signed cryptographic checksum. In cases where the purchase order was provided to the point of sale device 108, the authorization request may also include the purchase order.

In step 330, the issuing institution 106 may receive the authorization request, which may be forwarded by the payment network 110 directly to the issuing institution 106 or through one or more intermediate entities, such as the trusted service manager. In step 332, the issuing institution 106 may decrypt the payment token using the account public key. In some embodiments, the payment token may be decrypted by another entity, such as the payment network 110 or a trusted service manager, where the issuing institution 106 may receive the authorization request with the payment token decrypted. In step 334, the issuing institution 106 may approve the payment transaction. The approval of the payment transaction may be based on a successful verification of the cryptographic checksum, purchase order, and any digital signatures thereof using the respective public keys, as well as any other considerations that may be applicable in traditional payment transactions, such as a sufficient account balance or credit, blocked account, suspended account, etc.

Upon approval of the transaction, the issuing institution 106 may submit an authorization response to the payment network 110 that includes a response code indicating approval of the payment transaction, which may be forwarded on to the point of sale device 108, in step 336. In some embodiments, the payment token may remain in the authorization response in a decrypted form. In other embodiments, the payment token may be re-encrypted prior to submission of the authorization response. In step 338, the point of sale device 108 may digitally sign the product data for the product(s) purchased by the consumer 104 using the merchant private key. In step 340, the point of sale device 108 may electronically transmit the signed product data to the computing device 102. In step 342, the receiving device 202 of the computing device 102 may receive the signed product data. In step 344, the validation module 218 of the computing device 102 may validate the digital signatures on the products using the merchant public key associated with the point of sale device 108, which may be received therefrom or from another entity, such as a trusted service manager.

Process for Registration and Provisioning for the Computing Device

Figure 4A:
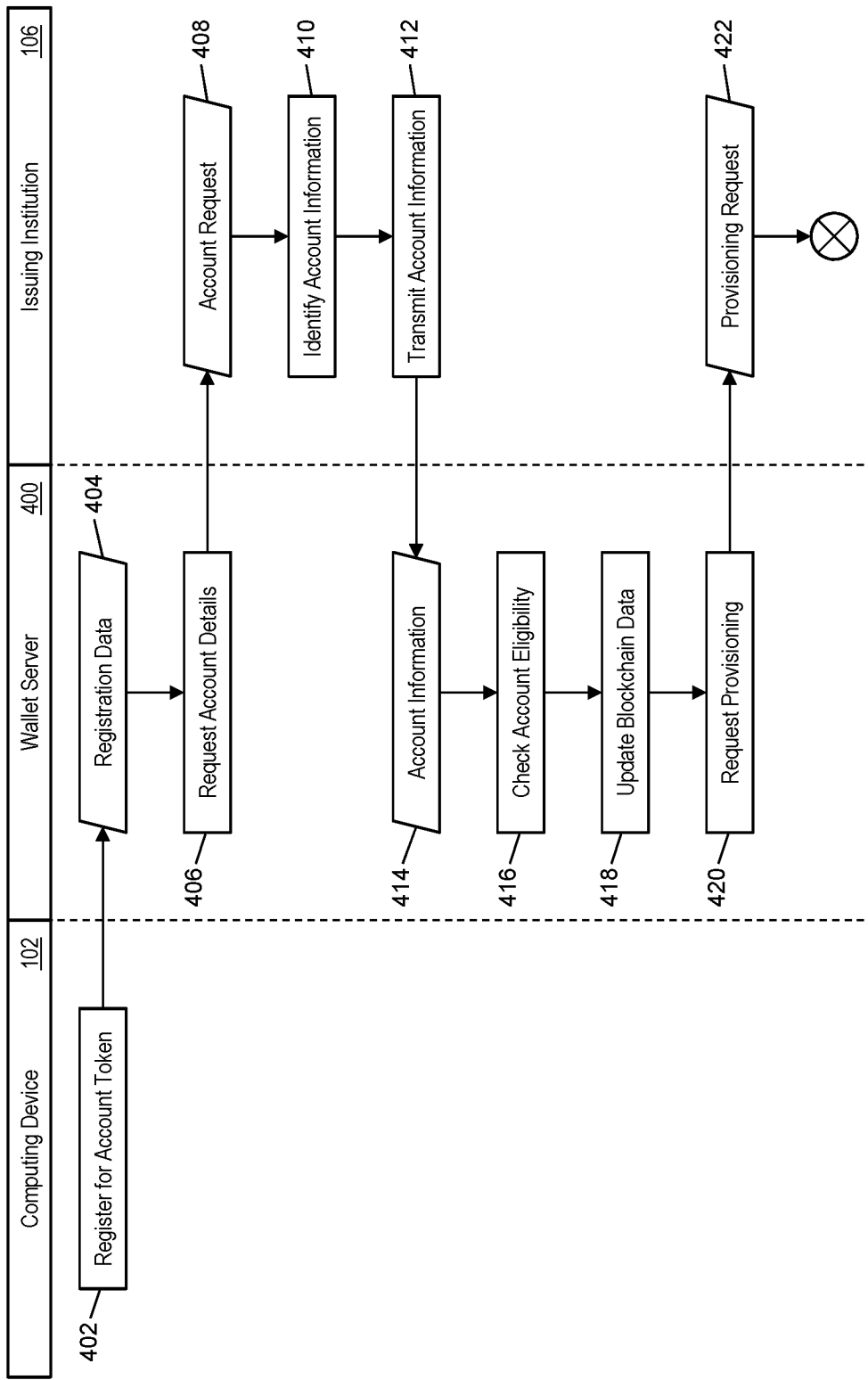
FIGS. 4A and 4B are a flow diagram illustrating a process for the registration of a computing device and provisioning of an account token thereto in the system of FIG. 1 in accordance with exemplary embodiments.
Figure 4B:
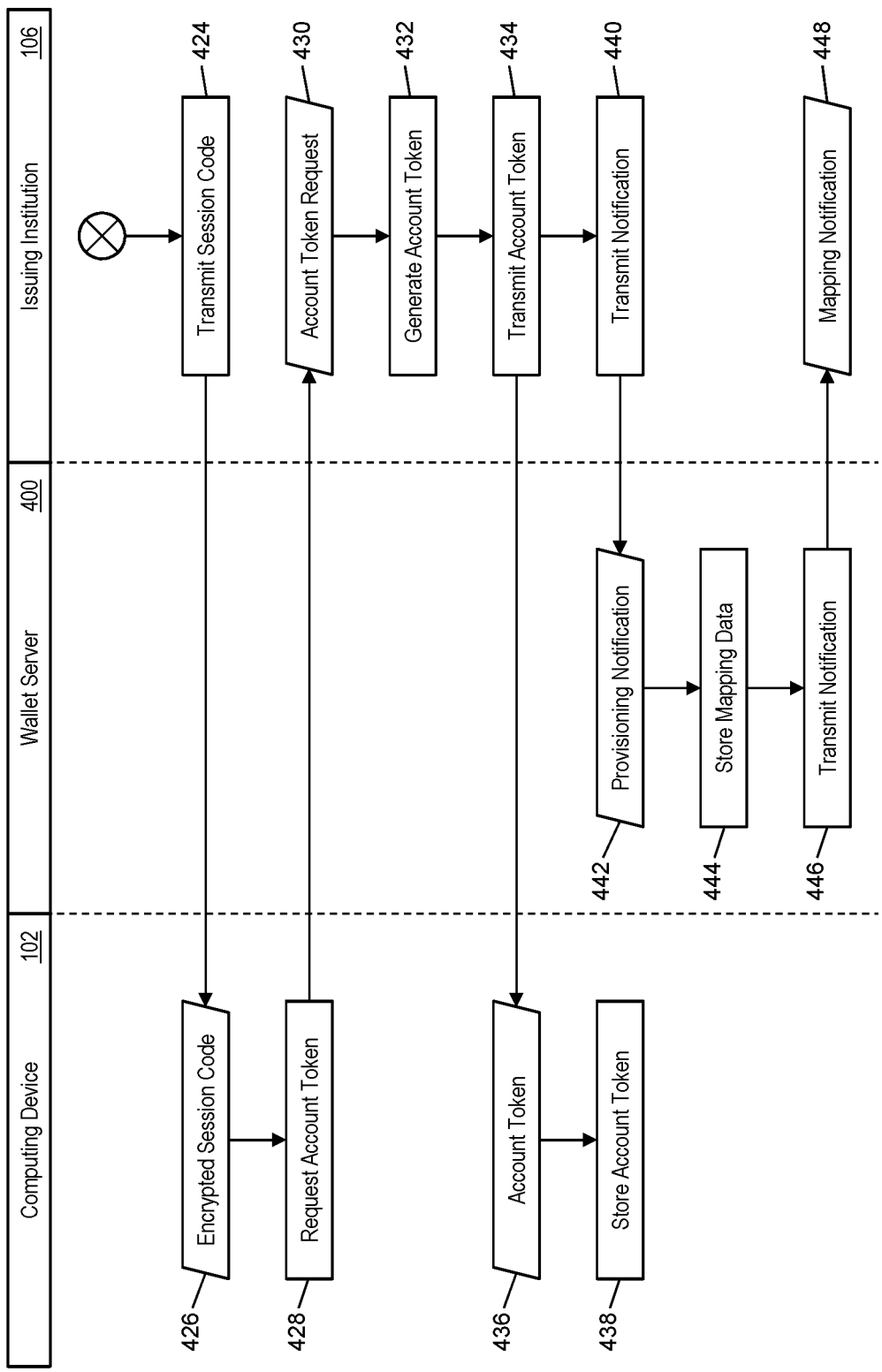

FIGS. 4A and 4B illustrate a process in the system 100 of FIG. 1 for the registration of the computing device 102 in the system 100 and the provisioning of an account token thereto.

In step 402, the computing device 102 may (e.g., as instructed by the consumer 104 as a user thereof) electronically transmit a data message to a wallet server 400 to register the computing device 102 for the provisioning of an account token thereto to use in the methods and systems discussed herein, such as described above and illustrated in FIGS. 3A and 3B. The wallet server 400 may be an external computing system configured to assist in the operation and management of a digital wallet application program on the computing device 102 or otherwise assist in the provisioning of account tokens to the computing device 102 and use thereof. In some embodiments, the wallet server 400 may be a part of the issuing institution 106, the payment network 110, a token service provider, or other entity. In step 404, the wallet server 400 may receive the registration data from the computing device 102. The registration data may include device information (e.g., a device identifier, device fingerprint, operating system information, etc.) and information associated with the transaction account being registered by the consumer 104, such as the account number or another account identifier. In some cases, the account data may be accompanied by authentication data for use in authenticating the consumer 104 as authorized to access the transaction account.

In step 406, the wallet server 400 may electronically transmit the account data (e.g., and authorization data, if applicable) to the issuing institution 106 using a suitable communication method in a request for account details. In step 408, the issuing institution 106 may receive the request. In step 410, the issuing institution 106 may identify the transaction account using the account identifier, and, if applicable, authenticate the consumer 104 using the authentication data, and identify account information associated with the transaction account. In step 412, the issuing institution 106 may transmit the account information to the wallet server 400, for receipt thereby, in step 414. The account information may include any information associated with the transaction account that may be used by the wallet server 400 in determining eligibility of the transaction account for use in the methods and systems discussed herein. For instance, some transaction accounts may be prohibited from utilizing tokenization, may be located in currencies prohibited for use by the wallet server 400, etc.

In step 416, the wallet server 400 may check to ensure that the transaction account is eligible based on the received account information. In some embodiments, if the account is found to be eligible, the wallet server 400 may request (e.g., via the computing device 102) the consumer 104 to accept terms and conditions or provide other information to satisfy additional eligibility requirements. In such embodiments, step 416 may not be completed until such information is received by the wallet server 400 and checked accordingly. In step 418, the wallet server 400 may request that the blockchain network 112 be updated as a result of the registration of the computing device 102. For instance, the wallet server 400 may communicate with a node in the blockchain network 112 for the generation and storage of a cryptographic key pair (e.g., by the wallet server 400, node, or other entity, such as the issuing institution 106) associated with the computing device 102 (e.g., or the transaction account, as may be in some instances where the computing device 102 may register multiple transaction accounts). In some cases, the blockchain network 112 may retain the public key but not possess the private key, which may be possessed by the wallet server 400 and/or provided to the computing device 102. In some cases, the cryptographic key pair may be generated using a hash value of data associated with the transaction account, such as a personal identification number provided by the consumer 104 (e.g., during the registration process).

In step 420, the wallet server 400 may electronically transmit a data message to the issuing institution 106 requesting that an account token for the registered account be provisioned to the computing device 102. It will be apparent to persons having skill in the relevant art that the steps performed by the issuing institution 106 in FIGS. 4A and 4B related to the provisioning of the account token to the computing device 102 may be performed by an alternative entity, such as a token service provider. In step 422, the issuing institution 106 (e.g., or token service provider) may receive the provisioning request. The request may include an account identifier or other information used to identify the transaction account, and may also include the public key of the cryptographic key pair or other public key for which the computing device 102 may possess or otherwise have access to the corresponding private key.

In step 424, the issuing institution 106 may electronically transmit a session code to the computing device 102. The session code may be encrypted by the public key or another suitable key or value for which the computing device 102 possess the corresponding data used for decryption. In step 426, the receiving device 202 of the computing device 102 may receive the encrypted session code, which may be decrypted by the encryption module 220 thereof using a suitable decryption key or private key. In step 428, the transmitting device 222 of the computing device 102 may electronically transmit a request for an account token to the issuing institution 106. The request may include the decrypted session code or a value generated therefrom or otherwise based thereon, which may indicate that the computing device 102 is authorized to receive the account token and is the correct, intended computing device 102. In some cases, the request may also include an account identifier. In other cases, the decrypted session code or other value may serve as the account identifier.

In step 430, the issuing institution 106 may receive the account token request. In step 432, the issuing institution 106 may generate the account token, which may include any payment credentials suitable for use in an electronic payment transaction, such as a transaction account number, expiration date, security code, name, application cryptograms, application transaction counter, etc. In step 434, the issuing institution 106 may electronically transmit the generated account token to the computing device 102. In some embodiments, the account token may be encrypted, such as by using the same public key or encryption key as the session code, or a separate key, which may, in some cases, be based on the session code. In step 436, the receiving device 202 of the computing device 102 may receive the account token, which may decrypted by the encryption module 220 thereof, if applicable. In step 438, the querying module 214 of the computing device 102 may execute a query on the memory 210 of the computing device 102 to store the account token and any additional data (e.g., mobile keys, session keys, single use keys, etc.) in a secure element, trusted execution environment, or other secure storage located therein.

In step 440, the issuing institution 106 may electronically transmit a notification to the wallet server 400 that indicates that the account token was provisioned to the computing device 102 successfully. In some cases, the notification may include the account token or other data that may be used to identify the account token. In step 442, the wallet server 400 may receive the notification. In step 444, the wallet server 400 may store data therein to be used in mapping and re-mapping the account token with corresponding transaction account data during electronic payment transaction processing. For instance, the wallet server 400 may include a lookup table that matches account tokens to other payment credentials for the mapping thereof during payment transaction processing. In some instances, the public key, private key, or any other data provided by the blockchain network 112 for integration thereof may be included. In step 446, the wallet server 400 may electronically transmit a notification to the issuing institution 106 indicating that the mapping is complete, which may further indicate that the account token is ready for use. In step 448, the issuing institution 106 may receive the notification.

In some embodiments, steps 442-446 may be performed by one or more alternative entities in place of the wallet server 400. For example, the wallet server 400 may store data associated with the account token (e.g., the identification data, such as a reference number), but may not be utilized for mapping. In such an example, the issuing institution 106 or a separate entity, such as the payment network 110, token service provider, etc., may performing the mapping. In such cases, the wallet server 400 may be used as an intermediary between the issuing institution 106 and the appropriate entity. For instance, the wallet server 400 may receive the account token and any additional data in step 442, but may forward the relevant data to the token service provider for the storage of mapping data. In some such embodiments, the alternative entity or entities may communicate with the issuing institution 106 with respect to providing a notification that the account token is ready for use. In some cases, the wallet server 400 may be notified by the appropriate entity, which may electronically transmit the notification to the issuing institution 106, in step 446.

Exemplary Method for Consumer-Initiated Transactions with Encrypted Tokens

Figure 5:
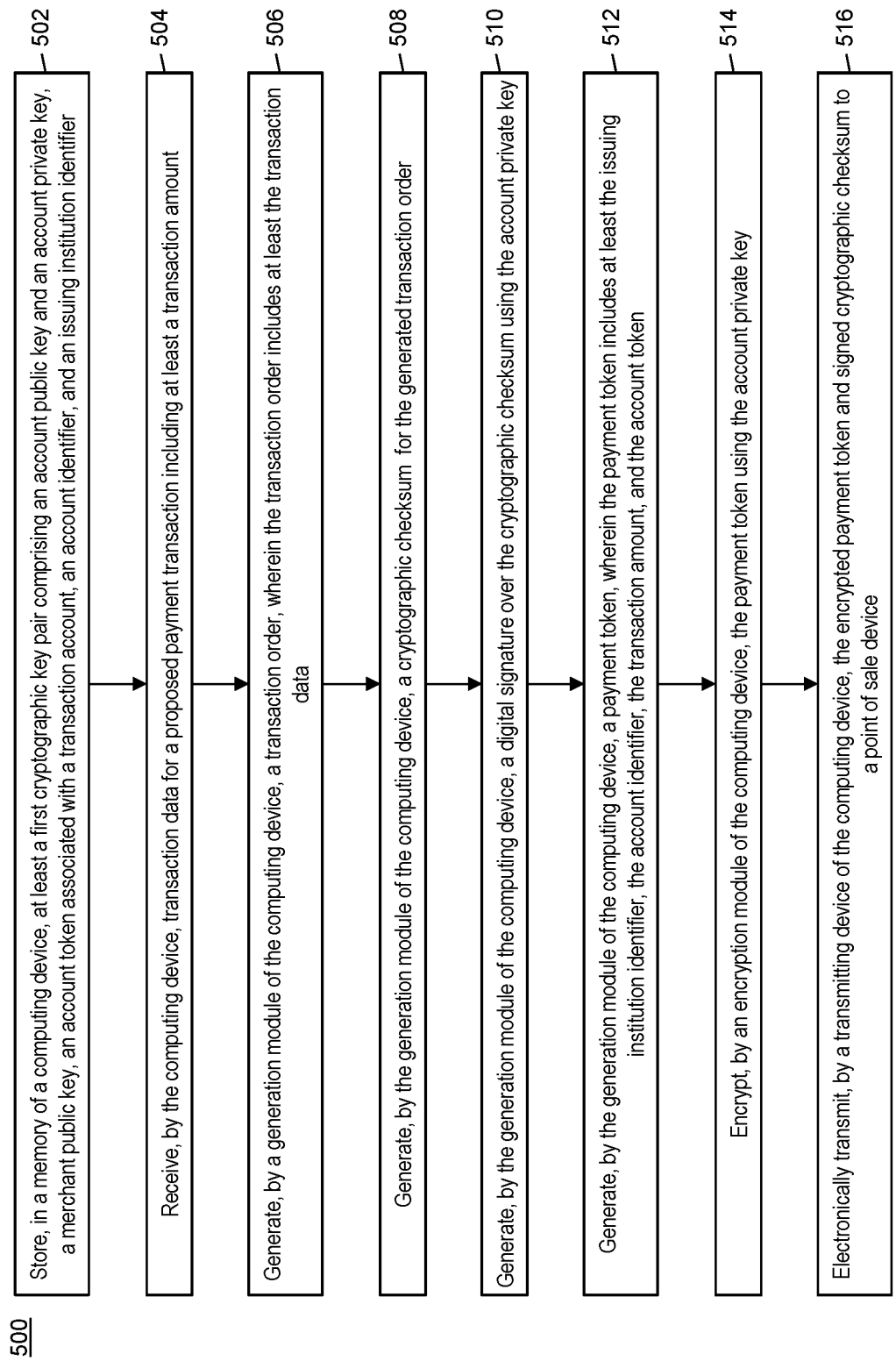
FIG. 5 is a flow chart illustrating an exemplary method for consumer-initiated transactions with encrypted tokens in accordance with exemplary embodiments.

FIG. 5 illustrates a method 500 for a consumer-initiated electronic payment transaction where payment credentials are captured in an account token included in an encrypted payment token.

In step 502, at least a first cryptographic key pair comprising an account public key and an account private key, a merchant public key, an account token associated with a transaction account, an account identifier, and an issuing institution identifier may be stored in a memory (e.g., the memory 210) of a computing device (e.g., the computing device 102). In step 504, transaction data may be received by the computing device for a proposed payment transaction including at least a transaction amount.

In step 506, a transaction order may be generated by a generation module (e.g., the generation module 216) of the computing device, wherein the transaction order includes at least the transaction data. In step 508, a cryptographic checksum may be generated by the generation module of the computing device for the generated transaction order. In step 510, a digital signature may be generated by the generation module of the computing device over the cryptographic checksum using the account private key.

In step 512, a payment token may be generated by the generation module of the computing device, wherein the payment token includes at least the issuing institution identifier, the account identifier, the transaction amount, and the account token. In step 514, the payment token may be encrypted by an encryption module (e.g., the encryption module 220) using the account private key. In step 516, the encrypted payment token and signed cryptographic checksum may be electronically transmitted by a transmitting device (e.g., the transmitting device 222) of the computing device to a point of sale device (e.g., the point of sale device 108).

In one embodiment, the merchant identifier may be associated with a merchant entity operating the point of sale device. In some embodiments, the transaction data may be received via an input device (e.g., the input device 206) interfaced with the computing device. In other embodiments, the transaction data may be received from the point of sale device by a receiving device of the computing device. In one embodiment, the transaction order may further include the account identifier and a merchant identifier.

In some embodiments, the method 500 may further include generating, by the generation module of the computing device, a nonce, wherein the transaction order further includes the generated nonce. In one embodiment, the method 500 may also include: receiving, by a receiving device (e.g., the receiving device 202) of the computing device, signed product data from the point of sale device; and validating, by a validation module (e.g., the validation module 218) of the computing device, the signed product data using the merchant public key. In a further embodiment, the transaction data may further include a product identifier, and the signed product data may include at least the product identifier. In some embodiments, the method 500 may further include: receiving, by the receiving device of the computing device, a blockchain transaction data value included in a block included in a blockchain, wherein the blockchain transaction data value includes the signed cryptographic checksum; and validating, by a validation module of the computing device, the signed cryptographic checksum using the account public key.

Computer System Architecture

Figure 6:
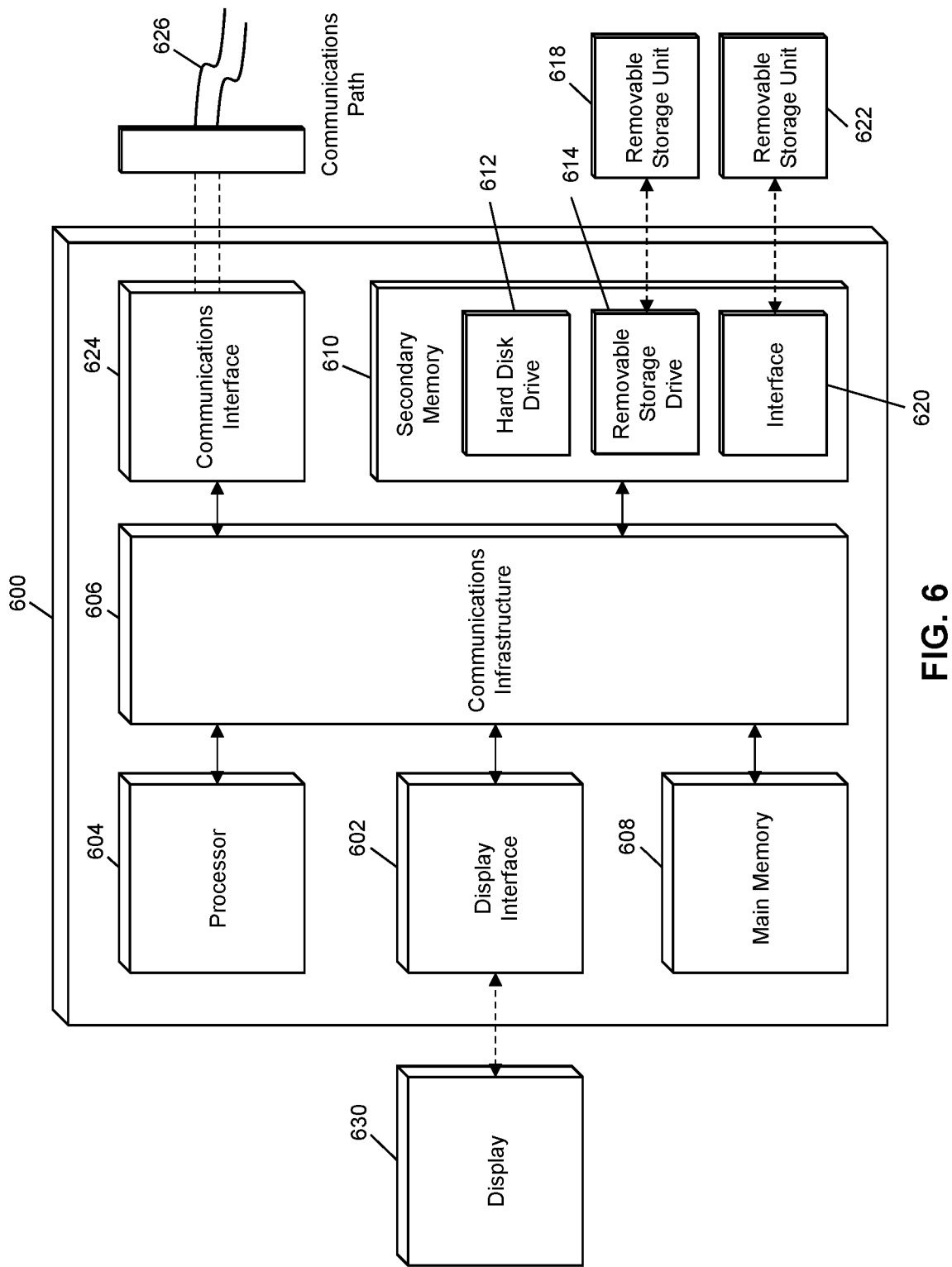
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the computing device 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4A, 4B, and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3A, 3B, 4A, 4B, and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for consumer-initiated transactions with encrypted tokens. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for consumer-initiated transactions with encrypted tokens, comprising:
   receiving, by a computing device, an encrypted session code from an issuing institution;
   decrypting, by the computing device, the encrypted session code received from the issuing institution;
   electronically transmitting, by the computing device, a request for an account token to the issuing institution, the request including the decrypted session code or a value generated from the decrypted session code, the decrypted session code or the value generated from the decrypted session code including an indication that the computing device is authorized to receive the account token;
   receiving, by the computing device, a first cryptographic key pair comprising an account public key and an account private key issued by the issuing institution, and the account token issued by the issuing institution, the account token serving as a payment credential;
   storing, in a memory of the computing device, at least the first cryptographic key pair comprising the account public key and the account private key, a merchant public key, the account token associated with a transaction account, an account identifier, and an issuing institution identifier;
   receiving, by the computing device, transaction data for a proposed payment transaction including at least a transaction amount;
   generating, by a generation module of the computing device, a transaction order, wherein the transaction order includes at least the transaction data;
   generating, by the generation module of the computing device, a cryptographic checksum for the generated transaction order;
   generating, by the generation module of the computing device, a digital signature over the cryptographic checksum using the account private key;
   generating, by the generation module of the computing device, a payment token, wherein the payment token includes at least the issuing institution identifier, the account identifier, the transaction amount, and the account token;
   encrypting, by an encryption module of the computing device, the payment token using the account private key; and
   electronically transmitting, by a transmitting device of the computing device, the encrypted payment token and signed cryptographic checksum to a point of sale device.

2. The method of claim 1, wherein
   the transaction data further includes a merchant identifier, and
   the payment token further includes the merchant identifier.

3. The method of claim 2, wherein the merchant identifier is associated with a merchant entity operating the point of sale device.

4. The method of claim 1, wherein the transaction data is received via an input device interfaced with the computing device.

5. The method of claim 1, wherein the transaction data is received from the point of sale device by a receiving device of the computing device.

6. The method of claim 1, wherein the transaction order further includes the account identifier and a merchant identifier.

7. The method of claim 1, further comprising:
   generating, by the generation module of the computing device, a nonce, wherein
   the transaction order further includes the generated nonce.

8. The method of claim 1, further comprising:
   receiving, by a receiving device of the computing device, signed product data from the point of sale device; and
   validating, by a validation module of the computing device, the signed product data using the merchant public key.

9. The method of claim 8, wherein
   the transaction data further includes a product identifier, and
   the signed product data includes at least the product identifier.

10. The method of claim 1, further comprising:

receiving, by the receiving device of the computing device, a blockchain transaction data value included in a block included in a blockchain, wherein the blockchain transaction data value includes the signed cryptographic checksum; and validating, by a validation module of the computing device, the signed cryptographic checksum using the account public key.

11. A system for consumer-initiated transactions with encrypted tokens, comprising:

a memory of a computing device configured to store at least a first cryptographic key pair comprising an account public key and an account private key issued by an issuing institution, a merchant public key, an account token associated with a transaction account, an account identifier, and an issuing institution identifier;

a receiving device of the computing device configured to:
  receive an encrypted session code from an issuing institution, and
  receive the first cryptographic key pair comprising the account public key and the account private key issued by the issuing institution, the account token issued by the issuing institution, the account token serving as a payment credential and transaction data for a proposed payment transaction including at least a transaction amount;

a decryption module of the computing device configured to decrypt the encrypted session code received from the issuing institution;

a generation module of the computing device configured to
  generate a transaction order, wherein the transaction order includes at least the transaction data,
  generate a cryptographic checksum for the generated transaction order,
  generate a digital signature over the cryptographic checksum using the account private key, and
  generate a payment token, wherein the payment token includes at least the issuing institution identifier, the account identifier, the transaction amount, and the account token;

an encryption module of the computing device configured to encrypt the payment token using the account private key; and a transmitting device of the computing device configured to:
  electronically transmit a request for the account token to the issuing institution, the request including the decrypted session code or a value generated from the decrypted session code, and wherein the decrypted session code or the value generated from the decrypted session code includes an indication that the computing device is authorized to receive the account token, and
  electronically transmit the encrypted payment token and signed cryptographic checksum to a point of sale device.

12. The system of claim 11, wherein
the transaction data further includes a merchant identifier, and
the payment token further includes the merchant identifier.

13. The system of claim 12, wherein the merchant identifier is associated with a merchant entity operating the point of sale device.

14. The system of claim 11, wherein the receiving device is an input device interfaced with the computing device.

15. The method of claim 1, wherein the transaction data is received from the point of sale device.

16. The system of claim 11, wherein the transaction order further includes the account identifier and a merchant identifier.

17. The system of claim 11, wherein
the generation module of the computing device is further configured to generate a nonce, and
the transaction order further includes the generated nonce.

18. The system of claim 11, further comprising:
a validation module of the computing device, wherein
the receiving device of the computing device is further configured to receive signed product data from the point of sale device, and
the validation module of the computing device is configured to validate the signed product data using the merchant public key.

19. The system of claim 18, wherein
the transaction data further includes a product identifier, and
the signed product data includes at least the product identifier.

20. The system of claim 11, further comprising:
a validation module of the computing device, wherein
the receiving device of the computing device is further configured to receive a blockchain transaction data value included in a block included in a blockchain, wherein the blockchain transaction data value includes the signed cryptographic checksum, and
the validation module of the computing device is configured to validate the signed cryptographic checksum using the account public key.

\* \* \* \* \*